United States Patent
Vallet et al.

(10) Patent No.: US 7,142,621 B2
(45) Date of Patent: Nov. 28, 2006

(54) METHOD AND CIRCUIT FOR RECOVERING A DATA SIGNAL FROM A STREAM OF BINARY DATA

(75) Inventors: Vincent Vallet, Mennecy (FR); Philippe Hanviller, Itteville (FR)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/280,285

(22) Filed: Oct. 24, 2002

(65) Prior Publication Data

US 2003/0086517 A1    May 8, 2003

(30) Foreign Application Priority Data

Oct. 26, 2001 (EP) ................. 01480100
Oct. 26, 2001 (EP) ................. 01480101
Oct. 26, 2001 (EP) ................. 01480104

(51) Int. Cl.
    *H04L 7/00* (2006.01)
(52) U.S. Cl. ............ 375/355; 375/316; 375/354; 375/373; 327/141; 327/144
(58) Field of Classification Search .......... 375/353, 375/316, 354, 340, 371, 373; 714/798; 360/51; 327/141, 144; 713/400, 401, 500, 600
    See application file for complete search history.

(56) References Cited

U.S. PATENT DOCUMENTS 5,587,709 A * 12/1996 Jeong ................. 341/100
5,892,631 A * 4/1999 Howell et al. ............ 360/51
6,229,861 B1 * 5/2001 Young .................. 375/356
6,266,799 B1 * 7/2001 Lee et al. ................ 716/6
6,868,134 B1 * 3/2005 Yoshizaki .............. 375/354
2002/0056069 A1 * 5/2002 Abe et al. ............... 716/1
2002/0133730 A1 * 9/2002 Zabinski et al. ......... 713/400
2003/0061564 A1 * 3/2003 Maddux ................. 714/798

OTHER PUBLICATIONS

Vallet et al., IBM filed concurrently herewith, entitled "Sample Selection and Data Alignment Circuit".
Vallet et al., IBM filed concurrently herewith, entitled "Transition Detection, Validation and Memorization Circuit".

* cited by examiner

*Primary Examiner*—Mohammed Ghayour
*Assistant Examiner*—Leila Malek
(74) *Attorney, Agent, or Firm*—Todd M. C. Li

(57) ABSTRACT

There is disclosed a data recovery (DR) circuit including an over sampling (OS) circuit, a transition detection (TD) circuit and a sample selection/data alignment (SSDA) circuit. A multiphase clock generating circuit delivering n phases is coupled to each of these circuits. The OS circuit over samples the received digital data stream and produces n sampled signals at each clock period. The TD circuit is configured to detect a data transition (if any) and to generate n select signals, only one of which is active and represents a determined delay with respect to the transition position, indicating thereby which over sampled signal is the best to be retained. The SSDA circuit is configured to generate the recovered (retimed) data signal that is aligned with a predefined phase of the multiphase clock signal. The data recovery circuit is well adapted to high speed serial data communications between integrated circuits/systems on digital networks.

6 Claims, 11 Drawing Sheets

Table 1

| G | $G_7$ $G_8$ $G_9$ $G_{10}$ $G_{11}$ | $G_0$ $G_1$ $G_2$ $G_3$ $G_4$ $G_5$ $G_6$ $G_7$ $G_8$ $G_9$ $G_{10}$ $G_{11}$ | $G_0$ $G_1$ $G_2$ $G_3$ $G_4$ |
|---|---|---|---|
| L | 0  0  0  0  0 | 0  0  0  0  0  X  X  1  1  1  1  1 | 1  1  1  1  1 |
| S | $S_7$ $S_8$ $S_9$ $S_{10}$ $S_{11}$ | $S_0$ $S_1$ $S_2$ $S_3$ $S_4$ $S_5$ $S_6$ $S_7$ $S_8$ $S_9$ $S_{10}$ $S_{11}$ | $S_0$ $S_1$ $S_2$ $S_3$ $S_4$ |
|   | T - 1 | T | T + 1 |

X = don't care

FIG. 14

METHOD AND CIRCUIT FOR RECOVERING A DATA SIGNAL FROM A STREAM OF BINARY DATA

CROSS REFERENCE TO RELATED APPLICATIONS

Cross reference is hereby made to U.S. patent application Ser. No. 10/280,286 entitled "Transition Detection, validation and Memorization Circuit" and Ser. No. 10/280,287 entitled "Sample Selection and Data Alignment circuit" which were filed on even date herewith.

FIELD OF THE INVENTION

The present invention relates to high speed serial data communications between integrated circuits/systems and more particularly to a data recovery circuit using over sampling which receives a stream of binary data at a determined frequency and supplies a data signal synchronous with a locally generated multiphase clock. The data recovery circuit of the present invention is substantially insensitive to data jitter and phase errors. Therefore, it is well adapted to be incorporated in a receiver to process digital data trains received via different channels from separate sources having no known phase relationship. The present invention also relates to a method for recovering a digital data signal from at least one stream of binary data.

BACKGROUND OF THE INVENTION

Clock and data recovery (CDR) circuits are extensively used in high speed serial data communications between integrated circuits/systems. The clock recovery (CR) circuit generates a recovered clock signal from the incoming data stream that is transmitted on a communication link which is subsequently used in the data recovery (DR) circuit for data capture using a single sampling pulse. In the case of long distance data communications, one CR circuit per communication link is required while in short-distance data communications, a single CR circuit is generally sufficient to interface with multiple communication links.

The performance of a CDR circuit is strongly tied to its jitter tolerance and to the incoming data stream jitter as well. However, the jitter tolerance is usually very low because the clock signal generator and CDR circuits are generally built using high stability Phase Locked Loop (PLL) oscillators, so that in turn, the recovered clock frequency is quite stable. On the other hand, in the case of a multiple channel serial data stream using a single CR circuit, there is an unpredictable phase difference (phase error) between data pertaining to different incoming data streams which limits the CR circuit jitter immunity. As a matter of fact, both phase error and jitter contribute to the reduction of the overall performance of multichannel CR circuits.

FIG. 1 shows the diagram of a typical 2.5 Gbits/s serial binary data (bits) stream signal consisting of one bit going from 0 to 1 and then back to 0 when the transmission is affected by a jitter (in this particular case, the frequency of the clock signal is half of the frequency of the incoming data). In FIG. 1, the bit boundaries are delimited by two transitions; when there is no change in the bit value, the bit boundaries are rather referred to as the bit edges. As apparent in FIG. 1, although the time-duration of a datum is about 400 ps, the useful window to perform a reliable sampling of the datum can be significantly shorter, e.g. 200 ps. Data jitter and/or phase error between the recovered clock and data signals can further reduce the useful sampling window. Moreover, circuit manufacturing process deviations, operating temperature and power supply variations can also have a negative impact on the targeted CDR circuit specifications. It is therefore difficult to ensure that the incoming data signal, which consists of a number of successive bits, is sampled in the centre of the bit time-duration.

FIG. 2 shows a typical multichannel data recovery (DR) circuit of the prior art referenced 10 placed in a receiver and adapted to interface with a transmitter in long distance serial data communications. Now turning to FIG. 2, DR circuit 10 is comprised of k blocks referenced 11-0 to 11-($k-1$), one for each communication link, and a PLL (oscillator) 12 controlled by a reference clock (Ref. clock). The data that are serially transmitted are iso-synchronous on each of the k communication links. Each block 11 consists of a front end delay circuit 13 and a phase detector circuit 14 that are serially connected. Data-in 0 is applied to the delay circuit 13-0, in turn, the delayed data are applied to a first input of the phase detector circuit 14-0, the other input of which is connected to the output of PLL 12 which generates (at least) the two phase of a clock signal, one phase is used to detect the transition and the other to capture the data. The incoming data, e.g. data-in 0, is thus tuned by the front end delay circuit 13-0 while the phase detector circuit 14-0 controls the input delay to capture and reshape the data within each link to supply the recovered (or retimed) data-out 0 signal (the same principle applies to the other links). Circuit 10 has some inconveniences. First of all, delay elements 13 are noisy and then generate much jitter. In addition, because circuit 10 is synchronous, the PLL 12 needs to run at the same frequency for all the links, so that said transmitter and receiver need to be synchronized on the same reference clock signal because of the lack of a CR circuit. The reference clock needs to be transmitted in addition to the data, thus at the cost of an extra channel. As a result, circuit 10 is not adapted to long distance multiple channel serial data communications.

FIG. 3 shows a conventional clock and data recovery (CDR) circuit referenced 15. Now turning to FIG. 3, CDR circuit 15 consists of k identical blocks referenced 16-0 to 16-($k-1$) one per communication link. The incoming data, e.g. data-in 0, is applied to the first input of phase and frequency detector (PFD) circuit 17-0 and to a first input of latch 18-0. The output of the PFD circuit 17-0 is connected to a PLL oscillator 19-0 via a filter 20-0 to stabilize the control signal which is applied thereon. PLL (oscillator) 19-0 generates two phases (at 90° shift) of a single clock signal, one is used to detect the transition in the incoming data and the other to capture the data as standard. A first output of PLL oscillator 19-0 is connected either directly or via a frequency divider to the other input of PFD circuit 17-0 and the second output thereof is connected to latch 18-0. Latch 18-0 generates the recovered (retimed) data-out 0 signal and the PLL 19-0 generates the recovered clock signal. The same construction applies to other communication links, so that trains of incoming data and related clock signals are recovered by the CDR circuit 15 in each channel. CDR circuit 15 is thus asynchronous which is a real advantage for long distance multichannel high speed serial communications. Unfortunately, this solution is relatively costly in terms of silicon area and power consumption. Unlike the DR circuit 10 implementation, the CDR circuit 15 requires a PLL, a filter and a PFD circuit for each link, that are known to occupy a large area on the silicon chip surface. In particular, the filter consumes a large area because it includes high value capacitors (sometimes packaged out of the silicon chip, for instance, mounted on the printed board itself). Moreover, because it is quite impossible to have a large number of PLL oscillators running at equivalent frequencies, the coupling between PLLs produces interference which are a big concern in terms of jitter. Finally, it is very unlikely, if not impossible, that the respective recovered clock signals are in phase. As a consequence, circuit 15 design is clearly not applicable to more than 4–8 channels.

Therefore, implementation of numerous channels (e.g. 16) that are now required for advanced long distance high speed multichannel serial data communications is not satisfactorily achieved to date.

SUMMARY OF THE INVENTION

It is therefore a primary object of the present invention to provide a data recovery circuit that is substantially insensitive to data jitter.

It is another object of the present invention to provide a data recovery circuit that is adapted to receive digital data signals in long distance high speed serial communications.

It is another object of the present invention to provide a data recovery circuit that consumes minimal area and power when integrated in a silicon chip.

It is another object of the present invention to provide a multichannel receiver that is adapted to receive digital data signals in long distance multichannel high speed serial communications.

It is another object of the present invention to provide a multichannel receiver that cancels phase errors in the incoming data allowing thereby to deliver in-phase recovered data.

It is still another object of the present invention to provide an improved method for recovering a digital data signal from a stream of binary data.

The above and other objects of the present invention are accomplished by a method and a completely digital electrical circuit for recovering a datum from a serial data stream and aligning it on a predefined phase of a locally generated multiphase clock signal.

According to the present invention there is first described a data recovery (DR) circuit which comprises an over sampling (OS) circuit, a transition detection (TD) circuit or a transition detection/validation/memorization (TDVM) circuit and a sample selection/data alignment (SSDA) circuit that are coupled to a multiphase clock signal generator. The incoming serial binary data (bits) stream is over sampled in the over sampling circuit by means of the n phases of a multiphase clock signal. The frequency of the clock is usually the same or half of the frequency of the incoming data. The sampled signals are applied to said TD and SSDA circuits. The role of the TD circuit is to detect detect any transition between two consecutive bits (if any). In a preferred embodiment based on the TDVM circuit, any transition will be detected twice, i.e. at two over sampled signals, the position of the latest detection will be validated and memorized as being the transition position. The memorized signal, referred to as a select signal, is used to drive the SSDA circuit so that the sampled signal that is selected is approximately at the centre of the bit duration, i.e. the farthest from the bit edges. The TDVM circuit is designed to be relatively insensitive to noise, i.e. to ignore sampling errors caused by glitches. Finally, the SSDA circuit is designed to capture the selected sampled signal and to realign it with a predefined phase of the multiphase clock signal, so that the data that is output therefrom (recovered data-out) is synchronous therewith.

Because the data recovery circuit described above is able to self-detect where the data are to be sampled, it is much less sensitive to jitter (very fast transition detection by construction) and phase errors and thus is well adapted to be placed in a receiver for multichannel long distance high speed serial data communications between integrated circuits/systems. Such a receiver would comprise a plurality of k identical data recovery circuits, one for each data stream and a multiphase clock generator to generate said multiphase clock signal (n phases) that is necessary for its operation. The receiver allows processing of a sampled signal during the totality of one clock period (T) which provides greater margin for error when compared to the time interval between two phases (T/n).

The present invention also relates to an improved method for recovering a data from a binary serial data stream.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

FIG. 14 shows a Table indicating which sampled signal (S) is selected versus the combination of the select signals (G) and the underflow/overflow bit (L) generated by the overflow/underflow detection circuit of FIG. 12 (when it is adapted to process one bit per clock period).

DESCRIPTION OF A PREFERRED EMBODIMENT

Figure 1:
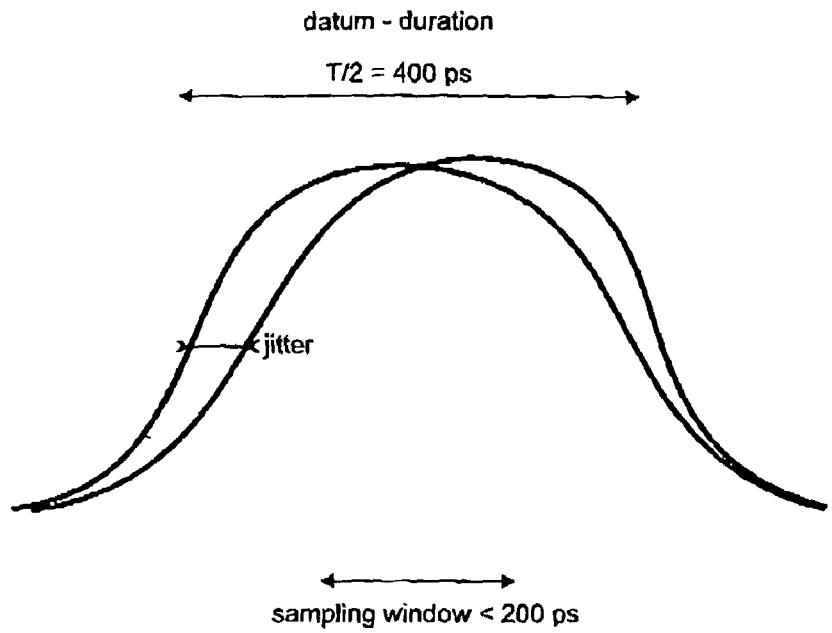
FIG. 1 shows the diagram of a bit in a typical 2.5 Gbit/s serial data stream when the transmission is affected by jitter.
Figure 2:
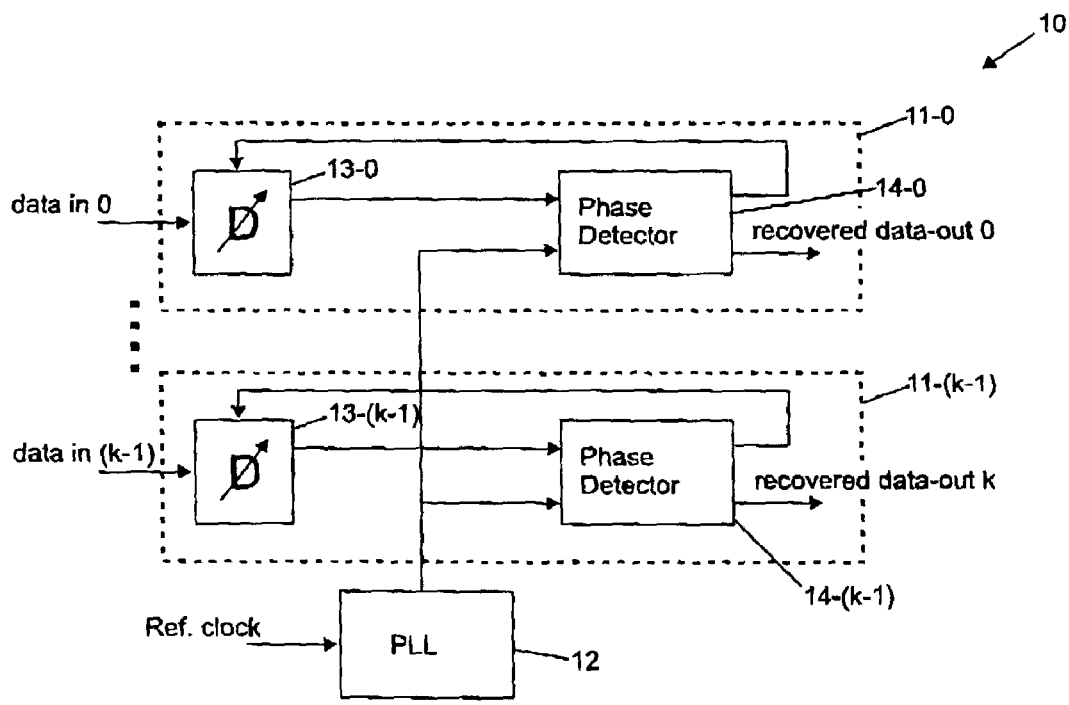
FIG. 2 shows a conventional data recovery circuit of the prior art.
Figure 3:
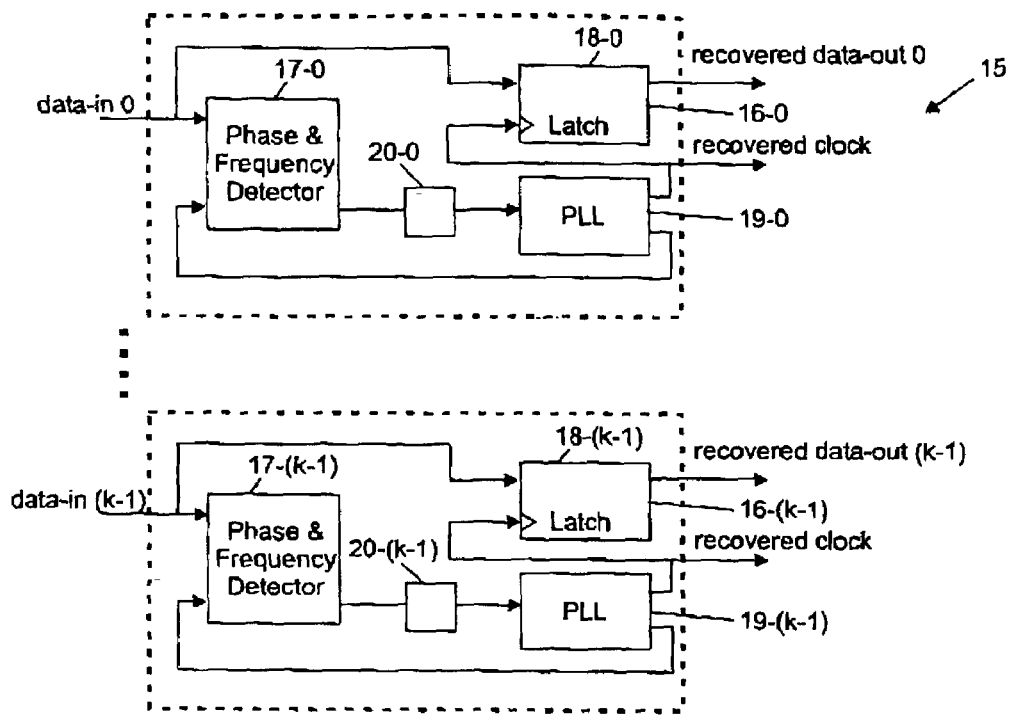
FIG. 3 shows a conventional clock and data recovery circuit of the prior art.

In the conventional circuits described above by reference to FIGS. 2 and 3, two different phases of a reference clock signal delayed in time are used, one to detect a transition and the other to capture the data for subsequent processing. However, it should be noted that because of possible metastability problems, the particular sampled signal (or sample) obtained by performing the sampling at a data transition (logic state 1 to 0 or vice-versa) is not reliable to accurately locate the exact position of the transition and the detection is even more complicated by the presence of glitches and false detections. As a result, the conventional techniques of sampling that have been practiced so far appear to be close to the limit as the clock frequencies continue to sharply increase.

In essence, the method of the present invention that will be now described in detail, relies upon an over sampling technique and a specific signal processing method to determine which sampled signal among the full set of sampled signals must be selected to represent the real value of the input signal in the incoming data stream.

Figure 4:
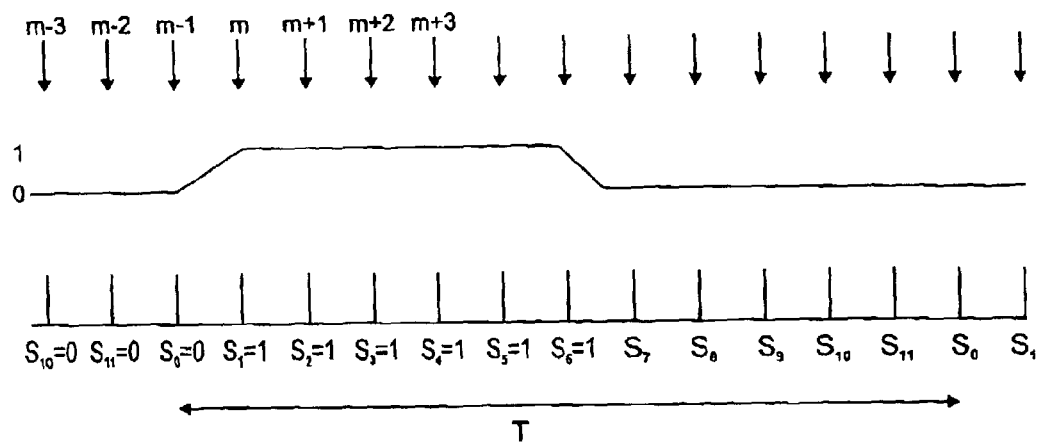
FIG. 4 is a diagram to illustrate the basic principles of the over sampling technique according to the present invention that uses the n=12 phases, labeled $C_0$ to $C_{11}$, that are obtained with the oscillator of FIG. 6.
Figure 4:
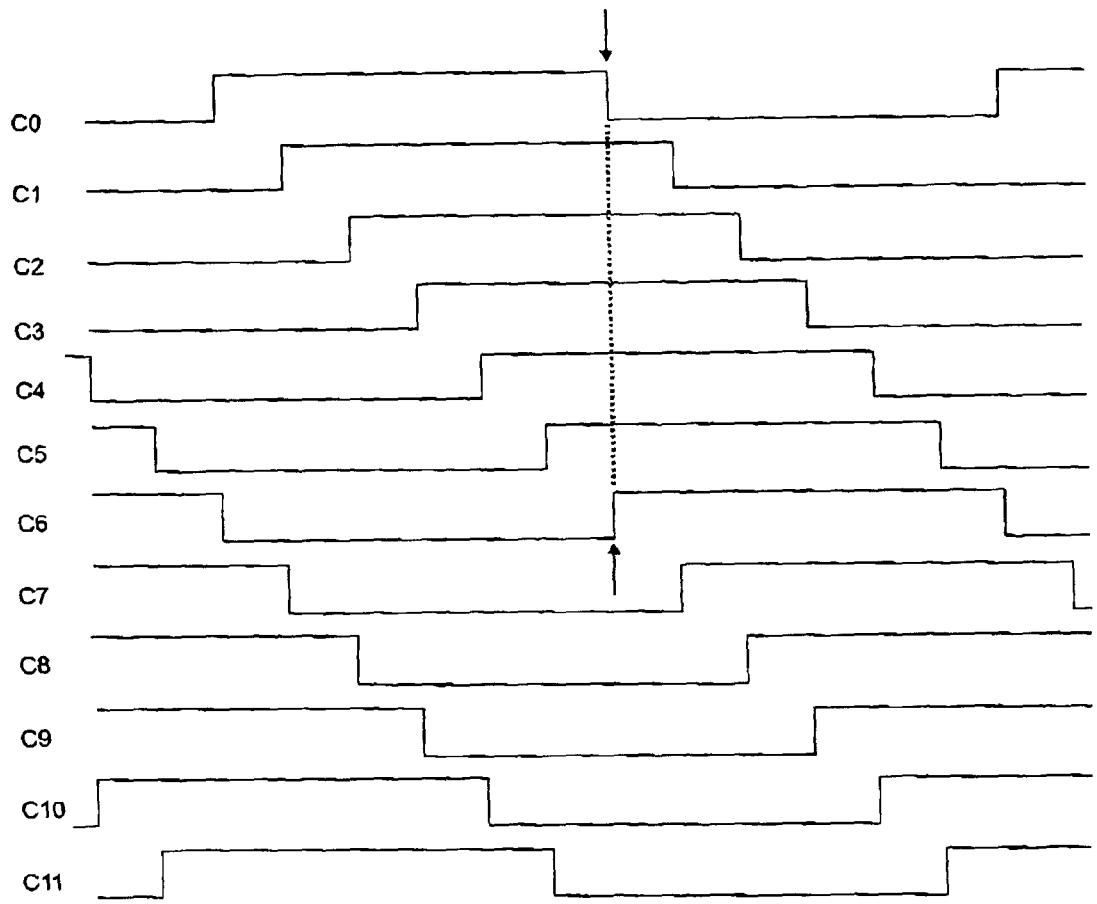

FIG. 4 is an example of a typical data bit stream, assuming that the clock frequency is one half of the incoming data frequency (the frequency of the multiphase clock is usually the same or half of the frequency of the incoming data signal). As apparent in the upper part of FIG. 4, the data goes from 0 to 1 (first transition) and then back from 1 to 0 (second transition), so that a first bit equal to 1 is followed by a second bit equal to 0. The arrows are related to the relative positions of the leading edges of the clock signals shown in the lower part of FIG. 4. In this case, there are n=12 clock signals, labeled C0 to $C_{11}$, generated by the multiphase clock generator that determine the times/positions where the data-in stream is sampled. Because, still in the instant case, the clock oscillates at half the frequency of the incoming data, clock signals $C_0$ and $C_6$ are delayed by a half-period and are in total phase opposition. Twelve sampled signals $S_0$–$S_{11}$ are thus obtained for each period T of the clock signal wherein $S_0$–$S_5$ represent the sampled signals for the first bit and $S_6$–$S_{11}$ represent the sampled signals for the second bit of the data stream. Note that, if there is no change in the transmitted data, e.g. a series of "1" is sent, in this case there is no longer a transition between two consecutive bits and the boundary therebetween is rather defined by the wording "edge of a datum".

The over sampling and the specific signal processing mentioned above that will be now described in detail significantly departs from said conventional techniques. According to the present invention, the specific signal processing to locate the transition position in the data stream is based on three comparisons performed at each sampling on a specific set of sampled signals. Still referring to FIG. 4, for instance, at position (m+2) or later on, three comparisons are performed on the sampled signals obtained at positions (m−2), (m−1), (m+1) and (m+2), i.e. $S_{m-2}$, $S_{m-1}$, $S_{m+1}$ and $S_{m+2}$, to check whether or not the following rules written in a mathematical form are met:

$$S_{m-2}=S_{m-1} \quad (1)$$

$$S_{m-1}\neq S_{m+1} \quad (2)$$

$$S_{m+1}=S_{m+2} \quad (3)$$

Let us assume that when these relations (1)–(3) are verified, this means that a transition has occurred at position (m). A transition that occurred at position (m) will be thus identified at the time of position (m+2) or later on. Therefore, two operations based on three comparisons involving six over sampled signals (the central one being excluded at each time) are thus necessary to detect a transition. As a result, the above method is based upon an "a posteriori" decision.

It is to be noted that according to the method of the present invention, any transition will be detected twice, since two over sampled signals will meet rules (1)–(3). As apparent in FIG. 4, position (m−1) matches the above transition detection conditions as does position (m). This means that the transition is either centered on the position of over sampled signals $S_{m-1}$ or $S_m$, therebetween. Still according to the method of the present invention, only the second transition detection will be considered because it offers an extra delay to the following circuitry.

Therefore, according to the present invention, for a reliable process to avoid errors that could be caused by such a double transition detection, when a transition is detected at position (m), if it was previously detected at position (m−1), this position (m−1) will be invalidated and the transition is said to be located at position (m). Note that, still according to the present invention, sampled signal $S_m$ will not be used because it is not considered reliable enough. In this particular instance where there are six samplings per bit, the sampled signal at position (m+3) is preferred as being approximately at the centre of the bit duration and it offers the maximum tolerance to the jitter. In the following description, the sampled signal at position (m+3), i.e. $S_{m+3}$, will be used as reliably representing the bit value (although sampled signals at positions (m+1) and (m+2) would also be adequate too. More generally, if a transition is detected at position (m), the sampled signal to be kept is the signal at position (m+p), wherein p is the number n of samples divided by twice the number b of bits in one period of the multiphase clock signal (p=n/2×b). In the example shown in FIG. 4, the sequence of sampled signals is $S_{10}$=0, $S_{11}$=0, $S_0$=0, $S_1$=1, $S_2$=1, $S_3$=1, $S_4$=1, . . . , and so on. The transition is detected on the leading edges of clock signals $C_0$ and $C_1$, sampled signal $S_1$ is considered representing the transition, so that the sampled signal that will be subsequently used is $S_4$ obtained on the leading edge of clock signal $C_4$. As still apparent in FIG. 4, this method is interesting in that it compares sampled signals that are very close one from another, but the time open to perform this comparison is large when compared to the time interval between them.

The Multichannel Receiver 21

Figure 5:
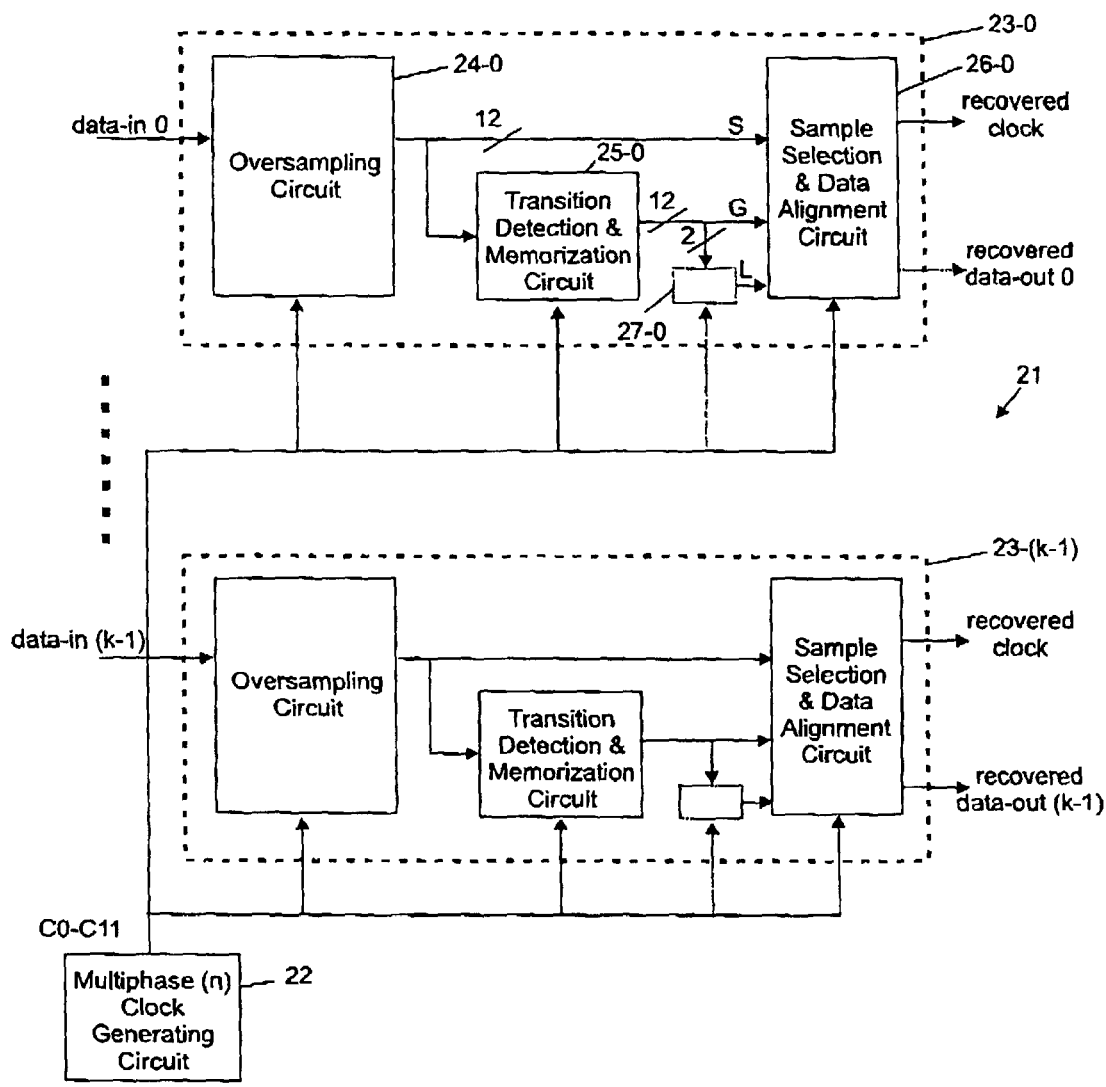
FIG. 5 schematically shows the architecture of a multichannel receiver comprised of a plurality of data recovery circuits of the present invention and a local multiphase clock generator.

FIG. 5 shows the architecture of the multichannel receiver referenced 21 that performs the data recovery on a plurality of incoming data streams for high speed serial data communications according to the present invention. Now turning to FIG. 5, the receiver 21 first comprises a multiphase clock generation circuit 22 and k data recovery circuits, labeled 23-0 to 23-(k−1), one for each data stream: data-in 0 to data-in (k−1). Basically, multiphase clock generation circuit 22 is identical to the combination of PFD circuit 17, 2-phase PLL oscillator 19 and filter 20 shown in FIG. 3, except in that it generates twelve clock signals ($C_0$–$C_{11}$) for each period instead of two.

Each DR circuit 23 comprises an over sampling (OS) circuit 24, a transition detection/validation/memorization (TDVM) circuit 25 and a sample selection and data alignment (SSDA) circuit 26. Optionally, an overflow/underflow detection (OD) circuit 27 can be used to improve SSDA operation and thereby the DR circuit overall performance. The multiple phase clock signals generated by the clock generation circuit 22 are applied to all circuits 24-27 of DR circuit 23. If we consider DR circuit 23-0 which processes the data-in 0 stream, the sampled signals S output from OS circuit 24-0 are-applied to the TDVM circuit 25-0 and to a first input of the SSDA circuit 26-0 which also receives the signals, referenced G, generated by the TDVM circuit 25-0 on a second input. In turn, SSDA circuit 26-0 generates two signals: the recovered clock and the recovered data, in this case data-out 0. The recovered clock is a predefined phase of the multiphase clock signal and the recovered data is perfectly aligned therewith, allowing thereby an excellent subsequent processing of the recovered data. OD circuit 27-0 is connected to the output of TDVM circuit 25-0 (it is driven by 2 signals G corresponding to the centre of a bit duration) and to a third input of SSDA circuit 26-0. The role of OD circuit 27 is to extend the selection capability of the SSDA circuit and to improve the jitter immunity of DR circuit 23 in terms of jitter, i.e. to tolerate more jitter in the incoming data stream.

Let us consider data recovery circuit 23-0 for the sake of illustration. The serial data stream, data-in 0, is over sampled in OS circuit 24-0 by means of the twelve clock signals $C_0$ to $C_{11}$ generated by clock generation circuit 22 at each period of the multiphase clock signal. The frequency of the multiphase clock signal is usually the same or half of the frequency of the incoming data for stability reasons. The sampled signals S are fed in the TDVM circuit 25-0 and in the SSDA circuit 26-0. Innovative TDVM circuit 25-0 is comprised of three sections. The first section is built around a transition detection circuit that has been specifically designed to be relatively insensitive to noise, i.e. to ignore sampling errors caused by glitches. The second section aims to make the first transition detection inoperative when it is immediately followed by the second detection of the same transition. The role of the third section is to memorize the position of the second detection as being the transition position. In essence, the TDVM circuit 25-0 determines the position of a transition in the incoming data stream, it eliminates errors that could be due to glitches and finally, it memorizes the transition position. Signals output by TDVM circuit 25-0 are used to drive the innovative SSDA circuit 26-0 to select a valid, reliable sampled signal. The SSDA circuit 26-0 is further able to synchronize the selected sampled signal relatively to a predefined phase of the multiphase clock signals. In the above example described by reference to FIG. 4, where there are 6 clock signals for each bit of the incoming data, it is considered that if a transition has been detected at position (m), sampled signal $S_{m+3}$ at position (m+3) is the most reliable in all respects, because it is substantially at the centre of the bit duration at a position which is the farthest from the two extreme edges in the case the bit signal rises from 0 to 1 and then goes back from 1 to 0. Note that, if there is no subsequent detection of a transition in the incoming data stream (e.g. a series of "1"), this transition that has been memorized will be used to determine the sampled signal at the centre of each bit.

Let us now describe the different circuits composing the multichannel receiver 21, i.e. the clock generation circuit 22 and one data recovery circuit, generically referenced 23, in more detail.

The Clock Generation Circuit (CG) 22

Figure 6:
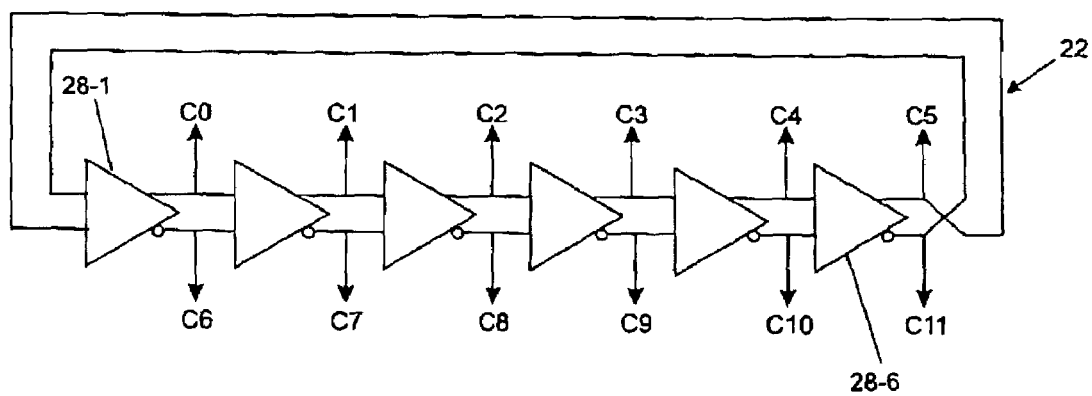
FIG. 6 shows a conventional 6-stage oscillator which generates the multiphase clock signals that are necessary for a proper operation of the receiver.

FIG. 6 shows a preferred implementation of a multiphase clock generation (CG) circuit 22 based upon a ring oscillator, although multiple phase clock signals can be generated using a number of conventional oscillating circuits as known for those skilled in the art. FIG. 6 shows a typical 6-stage ring oscillator that is well adapted to generate the twelve phases that are required in the description of the preferred embodiment of the present invention. As apparent in FIG. 6, the ring oscillator comprises 6 elementary differential buffers 28-1 to 28-6 that are serially connected for high stability. The multiple phase clock signals that are obtained are those referenced $C_0$ to $C_{11}$ in FIG. 4. They are either derived from a master reference clock signal having a frequency of N MHz (N=1/T) or extracted from the incoming data via a phase detector (PD) circuit. Note that the delays of buffers 28-1 to 28-6 are controlled by a common PFD/filter circuit forming a clock recovery unit which ensures that the frequency of the multiphase clock signals generated by CG circuit 22 is substantially the same or half the frequency of the data stream. As a result, in the case of multiple channels (i.e. communication links) it is possible to extract the clock from a single channel/link and use the recovered clock frequency for recovering the data on each of the other channels by performing a phase adjustment.

The Data Recovery (DR) Circuit 23

It is comprised of a few circuits that will be now described in detail.

The Over Sampling (OS) Circuit 24

Figure 7:
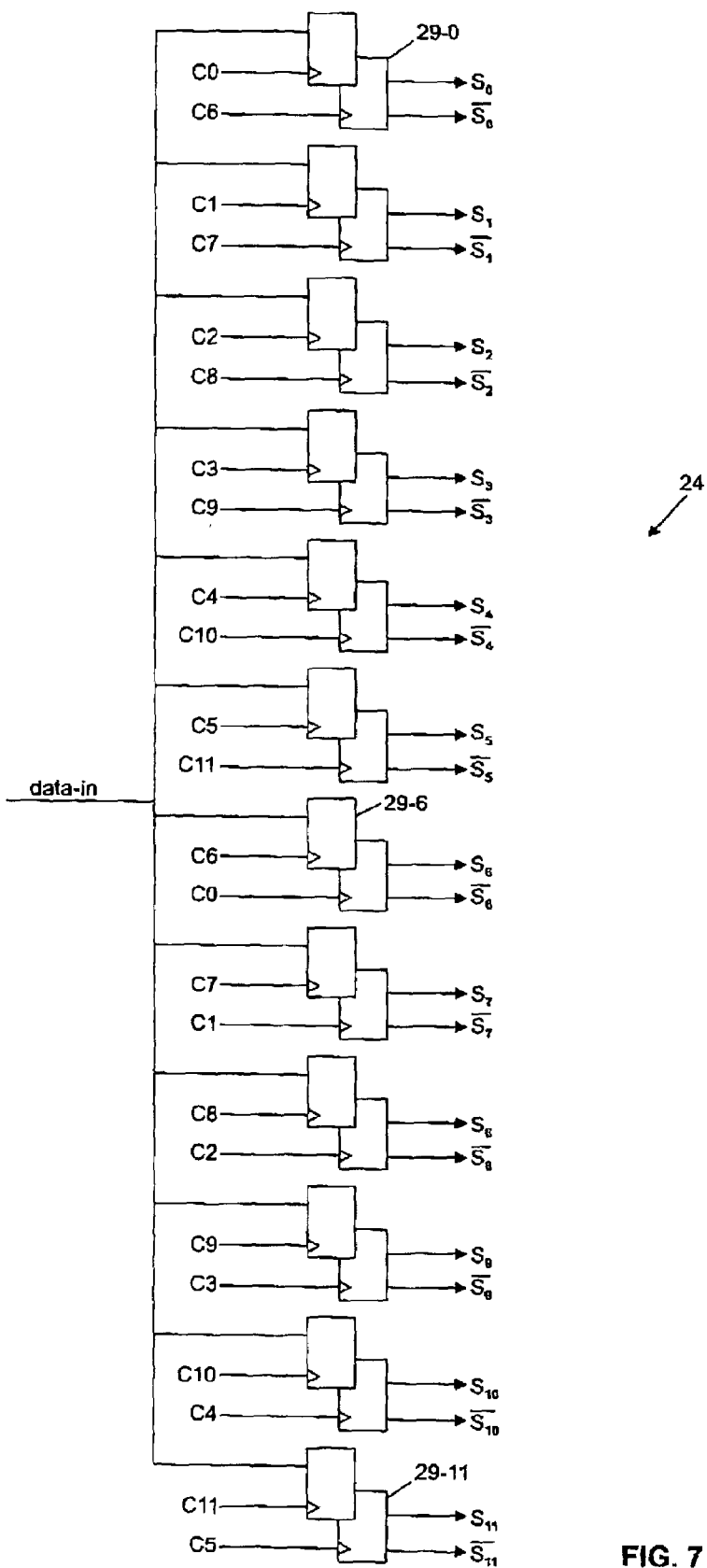
FIG. 7 shows the LSSD-based over sampling circuit which is used in the data recovery circuit of the present invention.

The OS circuit 24 (e.g. 24-0 for data-in 0 stream) which is shown in FIG. 7 has a particular construction to ensure a high stability to the sampled data signals at its outputs for a whole clock period. Because of the half-rate clock mentioned above, the over sampling circuit 24 collects two consecutive bits of serial data in 12 samples. The sampling of any data stream e.g. data-in 0, is done through edge sensitive flip-flops or preferably master-slave-latches 29-0 to 29-11 as illustrated in FIG. 7. Master-slave latches are preferred because they allow a level sensitive scan design (LSSD) implementation for better testability. For instance, let us consider latch 29-6. The master latch data input is connected to the data-in common line while its clock input receives the $C_6$ clock signal. When the master clock signal returns to the low state (logic 0), the data in the data-in stream is captured and is maintained for a whole clock period, irrespective of the variations that may occur thereon. In that respect, clock signal $C_6$ ensures that a very stable sampled signal $S_6$ is output, because the clock signal $C_0$ which is applied on the clock input of the slave latch is in phase opposition with clock signal $C_6$, as mentioned above.

The Transition Detection/Validation/Memorization (TDVM) Circuit 25

In essence, TDVM circuit 25 is comprised of three sections or stages, each performing a different function: detection, validation and memorization.

Figure 8A:
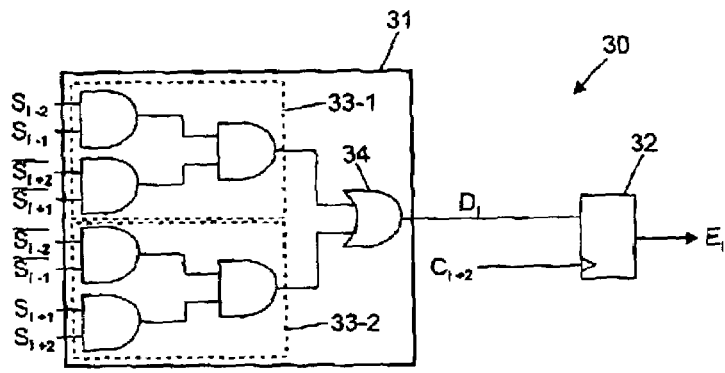
FIGS. 8*a* to 8*c* show the elementary circuits composing the transition detection/validation/memorization (TDVM) circuit which is an essential element of the data recovery circuit of the present invention to generate the select signals.

The circuit forming the first section is shown in FIG. 8a where it bears numeral 30. The role of circuit 30 is to detect any transition in the incoming data stream. For instance, assuming circuit 30 belongs to TDVM circuit 25-0, 12 identical circuits 30 are necessary to detect a transition in the data-in 0 stream. FIG. 8a shows only one circuit 30 using a current indicia i (i varies from 0 to 11) configured to detect a transition that would occur at position (i) corresponding to sampled signal $S_i$. It just suffices to vary indicia i from 0 to 11 to substantially derive the full set of circuits 30 as it will be shown later on by reference to FIG. 9. A transition at a given position is identified by examining at each sampling, whether the two previous sampled signals and the two next sampled signals meet the relations (1)–(3) given above or not. If $S_{i-2}=S_{i-1}$, $S_{i-1} \neq S_{i+1}$ and $S_{i+1}=S_{i+2}$, a transition is identified as being located at position (i). Note that, according to that present method, a transition will be systematically detected by two consecutive circuits 30. The particular construction of circuit 30 offers a major advantage, because it is insensitive to glitches which are often identified as a transition in standard edge detection circuits. A glitch, i.e. a very short parasitic pulse, can by no means meet the above relations (1)–(3).

Still considering FIG. 8a, circuit 30 is comprised of logic circuit 31 and level sensitive latch 32. Logic circuit 31 is comprised of two blocks 33-1 and 33-2 of three AND gates driving a two-way OR gate 34. Sampled signals that are applied to blocks 33-1 and 33-2 as inputs are specified in FIG. 8a. Logic circuit 31 generates an output signal $D_i$ which is at a high logic level (e.g. a "1") if the three above relations are verified for a particular value of current indicia i. The output of logic circuit 31 is connected to the data input of level sensitive latch 32 while clock signal $C_{i+2}$ is applied on its clock input (clock signal $C_{i+2}$ is used because it corresponds to sampled signal $S_{i+2}$ which is the latest of the signals applied to logic circuit 31). The signal which is output from level sensitive latch 32 is labeled $E_i$. The first section thus allows identification of a transition, without taking into account the sampled signal $S_i$ corresponding to this transition. Because of possible metastability problems, this particular sampled signal $S_i$ is not reliable.

Figure 8B:
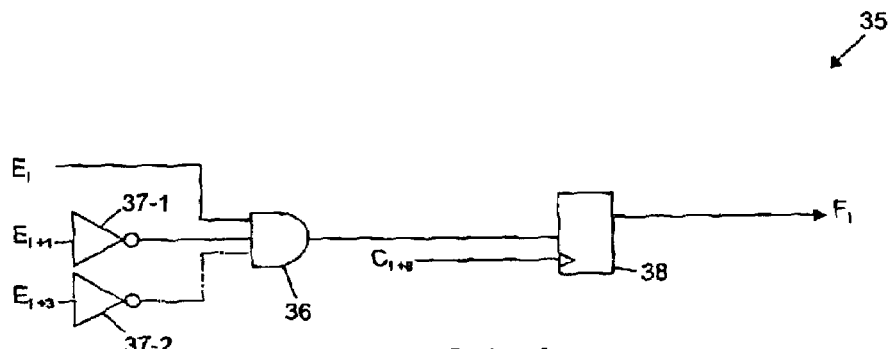

Due to the particular construction of circuit 30, any transition will be detected twice. Now, still according to the present invention, only the second detection will be considered to represent the transition. To that end, the second section of TDVM circuit 25 is thus built to only retain the last one of two (or more) consecutive detections to avoid any conflict therebetween. Therefore, the role of this section is to validate the position of the last detection of a same transition. Now turning to FIG. 8b, this second section is implemented by circuit 35. The signal $E_i$ that is output from circuit 30 is applied to a first input of AND gate 36. Signal $E_{i+1}$ is complemented in inverter 37-1 then applied to a second input of AND gate 36. Optionally, signal $E_{i+3}$ could also be applied on a third input of AND gate 36 via inverter 37-2 to improve glitch elimination. The signal that is output from AND gate 36 is applied to the data input of level sensitive latch 38 while its clock input is driven by clock signal $C_{i+8}$ ($C_{i+8}$ is selected because it is in phase opposition with $C_{i+2}$ to improve stability). The signal supplied by level sensitive latch 38 is labeled $F_i$. Latched signal $F_i$ thus represents a validated transition detection and remains valid during a full clock period. Note that level sensitive latches 32 (FIG. 8a) and 38 (FIG. 8b) can be combined in a single master/slave latch pair for improved testability and design simplicity, their clock signals being in phase opposition, i.e. separated by a half clock period. For instance, assuming the multiphase clock signal generated by CG circuit 22 has a frequency equal to 1.25 Ghz and having 12 phases, a transition can be identified at every 70 ps (800 ps/12) interval. Signal Fi at the output of circuit 35 would remain available the full clock period, i.e. 800 ps which gives a lot of time to the following circuits for its processing. Another advantage, is that, by construction, if two signals E, e.g. $E_{i-1}$ and $E_i$, arrive in sequence, not only $E_i$ is kept but it is used to reset signal $E_{i-1}$ and it will be captured later on with clock $C_{i+8}$. As a result, only the $E_i$ signal representing the position of the second or the last detection (in case of multiple detection) is validated and stored at a high level in level sensitive latch 38 as signal $F_i$. This detection will be referred to hereinbelow as "the detected transition".

Figure 8C:
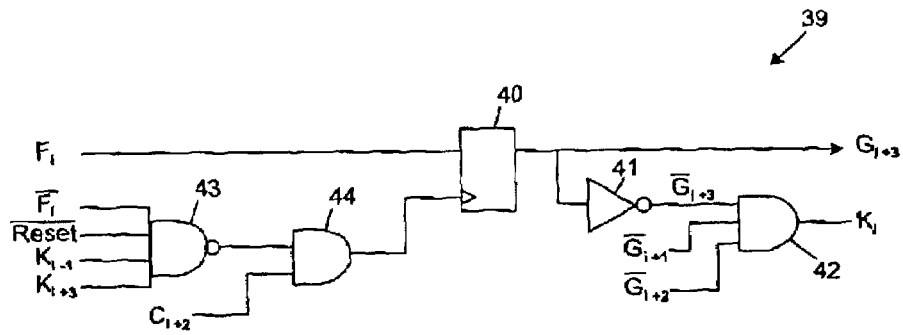

The third section of the TDVM circuit 25 memorizes the position of the detected transition in a memory element. Any detected transition sets the memory element to a high logic state ("1"). Any other detected transition within plus or minus 3 sampled signals resets the memory element. The signal available at the output of the memory element, is referred to hereinbelow as the "select" signal labeled G, because it will be used to select the best sampled signal S in the set. An important particularity of the memory element is that a select signal (e.g. $G_{i+3}$) can only be reset after another select signal (e.g. $G_j$) is set. It is expected that a new selected sampled signal would always appear in a position close to the previous one, so that two consecutive sampled signals selected during a short amount of time would not be a problem because they are far from the transition and would thus have the same value. A typical hardware implementation of the third section is represented in FIG. 8c by circuit 39 (it should be clear that there are as many circuits 35 and 39 as there are circuits 30). Signal $F_i$ supplied by circuit 35 is applied to a latch 40 which plays the role of the memory element mentioned above. The select signal that is output therefrom, is labeled $G_{i+3}$, i.e. the signal that selects the right sampled signal S, in the instant case $S_{i+3}$ in accordance with the above mentioned principle. Signals $-G_{i+3}$ (obtained by complementing signal $G_{i+3}$ in inverter 41), $-G_{i+1}$, and $-G_{i+2}$ are applied to AND gate 42 to generate signal $K_i$. $K_i$ is thus the signal that is internally used to reset the three preceding and the three following corresponding latches 40 in TDVM circuit 25. Signal $-F_i$, $K_{i-1}$, and $K_{i+3}$ are applied to a NAND gate 43. The signal that is output from NAND gate 43 and clock signal $C_{i+2}$ are applied to AND gate 44 to drive the clock input of latch 40. As a result of the particular construction of circuit 39, it is impossible to have all the select signals G at the low level at the same time. Let us consider the case of one bit per clock period and assume that $G_i$ is high. If now signal $G_{i+1}$ becomes high, it will force $G_i$ to go to the low state, so that after a clock period, there will be only one signal, i.e. $G_{i+1}$, at the high state. By contrast, if we have two bits per clock period, there will be two select signals active at the same time, one for each bit, the second one being unable to reset the first one as a result of the $K_i$ signal construction.

Figure 9:
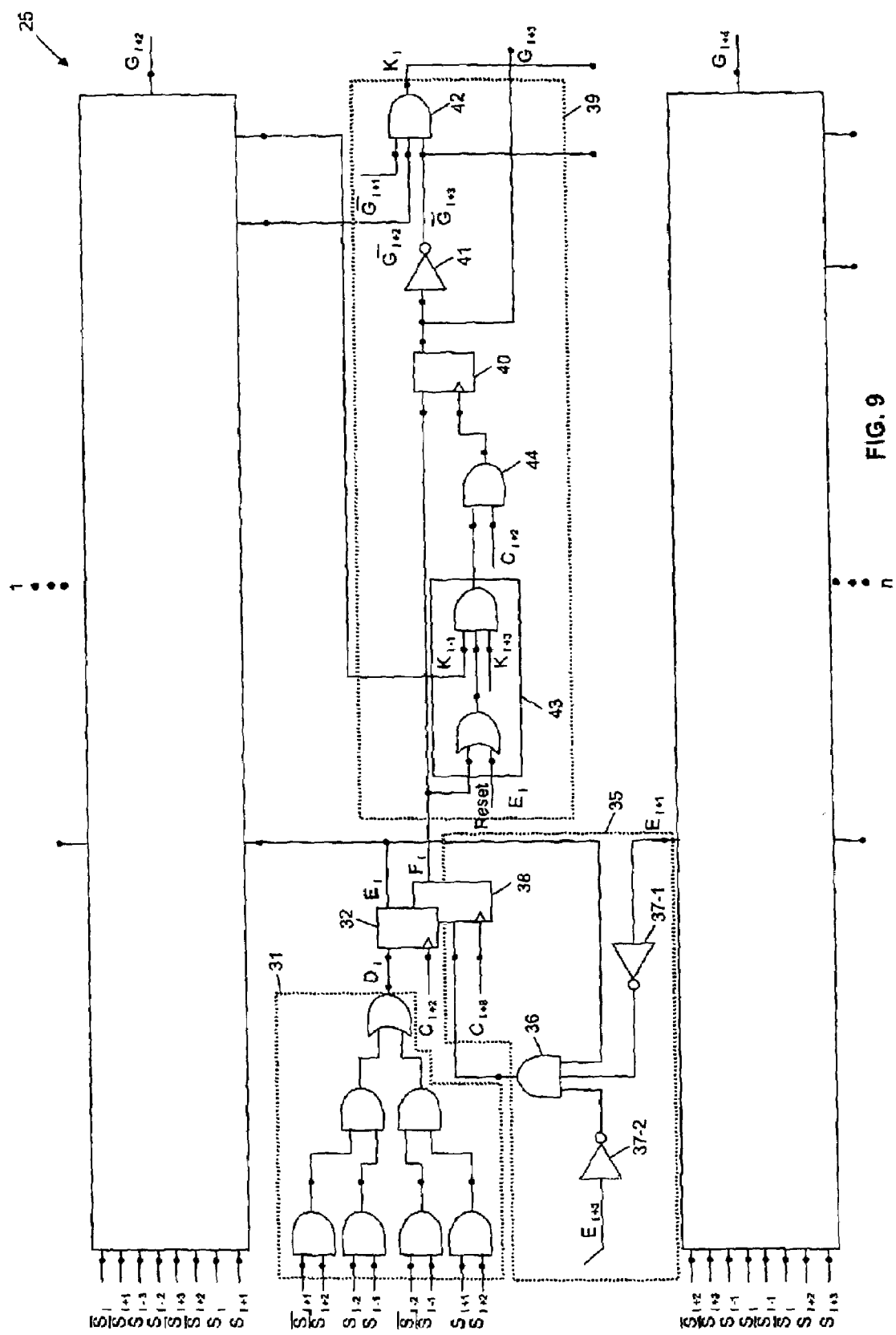
FIG. 9 shows an overall view of the transition detection/validation/memorization circuit grouping the elementary circuits described by reference to FIGS. 8*a* to 8*c*.

FIG. 9 shows a more realistic view of the TDVM circuit 25 interconnecting scheme which is comprised of 12 identical circuit slices, each slice basically corresponds to the integration of elementary circuits 30, 35 and 39 (some logic functions have been merged to avoid unnecessary duplication of circuits). Each slice thus corresponds to the detection/validation/memorization of the transition position performed at a determined sampling. The memorized signal is the select signal adequate to select the best sampled signal. Note that the last slice is connected to the first one. TDVM circuit 25 has as many select lines G as there are sample signals S, each select line corresponding to a sampled signal. A select line at the low level indicates that the corresponding sample must be dismissed while a select line at the high level means that the sample must be kept. In summary, in the preferred embodiment where we have two bits in twelve samples, the TDVM circuit 25 provides 12 select signals G, among them two select signals, e.g. $G_i$ and $G_{i+6}$, are high to indicate the rank of the sampled signals, in this case $S_i$ and $S_{i+6}$, to be kept as being the best of the sampled signals for each bit. These select lines are not expected to switch at the input data rate. In ideal conditions, after having been set, the select lines may not switch at all. In very noisy conditions, the switching activity on select lines is still supposed to occur at a frequency well below the incoming data rate.

The Sample Selection/Data Alignment (SSDA) Circuit 26

Figure 10:
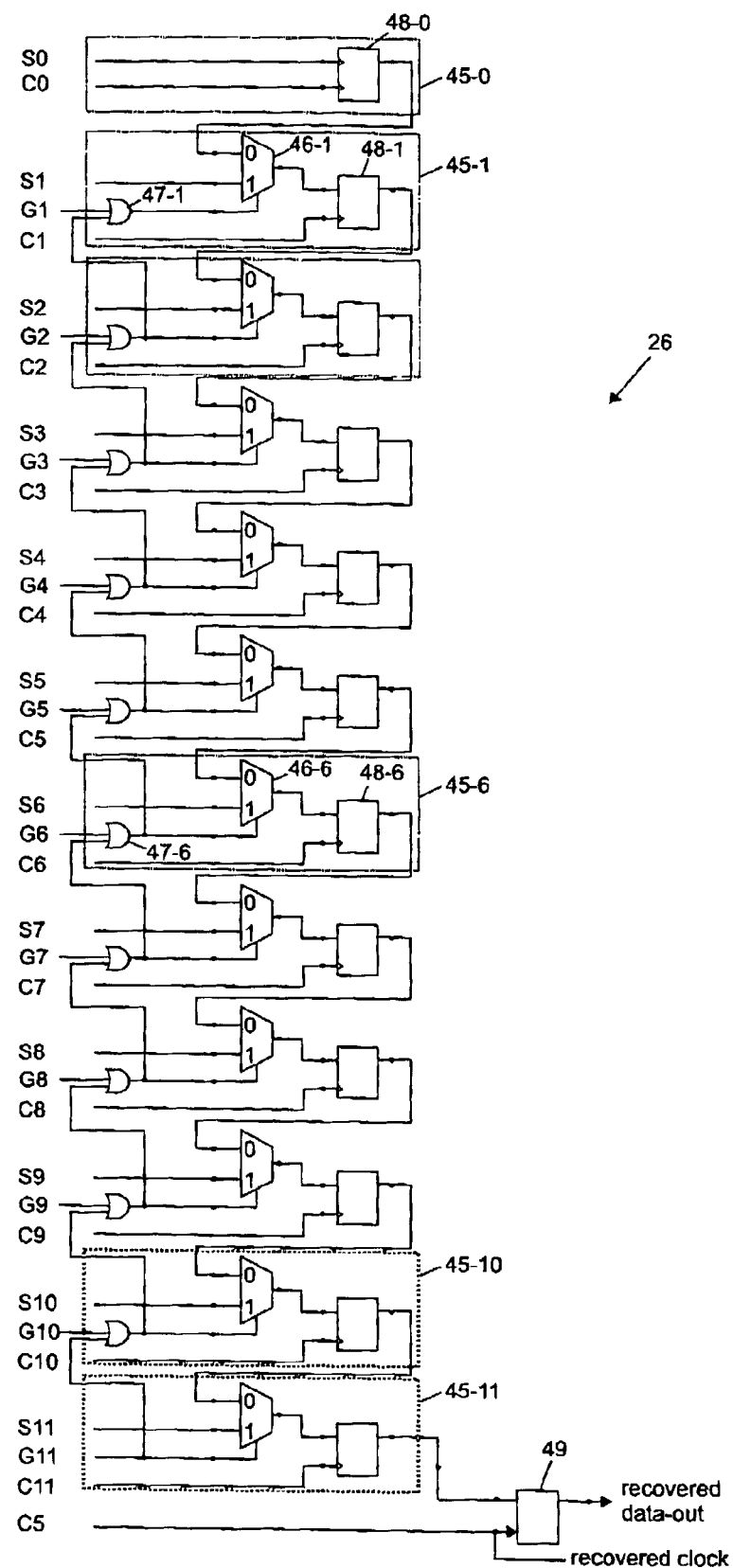
FIG. 10 shows the sample selection and data alignment circuit (SSDA) which is another essential element of the data recovery circuit of the present invention when adapted to process one bit per clock period.

As described above by reference to FIG. 9, the index of select signal $G_i$ corresponds to a sampled signal $S_i$. Select signal $G_{i+3}$ will select sampled signal $S_{i+3}$ (if two bits per period) or $S_{i+6}$ (one bit per period) and more generally select signal $G_i$ will select sampled signal $S_{i+n_i/2b}$ (where n is the number of phases of the reference clock signal and b is the number of bits per period). The SSDA circuit 26 is responsible for the selection of the adequate sampled signal and its alignment on a predefined phase of the multiphase clock signal. FIG. 10 schematically shows a preferred implementation of SSDA circuit 26 when designed to process a data bit stream having a rate equal to the frequency of the CG circuit 22, i.e. one bit per clock period. Circuit 26 first consists of a series of 12 logic blocks 45 that are substantially identical, each one consisting of a two-way multiplexer 46, an OR gate 47 and a level sensitive latch 48 connected as shown in FIG. 10. Note that in the first logic block 45-0, the multiplexer 46 and OR gate 47 are not implemented because select signal $G_0$ is not wired (it is not necessary). Latch 48-0 stores sampled signal $S_0$ when the clock phase signal $C_0$ is high. Its output is connected to the first input of multiplexer 46-1, sampled signal $S_1$ being applied to the other input. Multiplexer 46-1 is controlled by the select signal $G_1$ via OR gate 47. The output of multiplexer 46-1 is connected to the input data of latch 48-1 while phase signal $C_1$ is applied on its clock input. As apparent in FIG. 10, similar construction applies up to the last logic block 45-11 which processes signals $S_{11}$, $C_{11}$ and $G_{11}$ and feeds the data input of latch 49, the clock input of which receives the clock phase signal $C_5$. Note that, in the last logic block 45-11, the OR gate 47 has not been implemented. Latches 48 and 49 are of the level sensitive type. The data-out (recovered data) is available at latch 49 output and $C_5$ is referred to as the recovered clock. Each of the latches 48 (e.g. 48-1) is connected to its own clock phase (e.g. $C_1$). The latches are fed by either a sampled signal ($S_0, \ldots, S_{11}$) or by the signal that is output from the previous latch. The SSDA circuit 26 thus basically consists of a column of latches and a corresponding column of multiplexers, so that the logic blocks 45 are connected in a daisy chain fashion.

Multiplexers 46 are implemented to control which sampled signal feeds a given latch 48 and they are connected so that all sampled signals prior to the currently selected sampled signal (in a selected logic block), are captured in the corresponding latches. In all logic blocks positioned after the selected logic block that has captured the sampled signal, the select lines are all at the low level. Any sampled signal prior to the selected one is captured in a latch and any sampled signal after said selected one is ignored. As a consequence, the selected sample is synchronously flushed to the bottom of the column as it will be now described. If, for instance, the selected sampled signal is $S_6$, all the select signals $G_0$ to $G_{11}$ will be at the low logic level except select signal $G_6$ (corresponding to a transition detected at position 0), i.e. only the $G_6$ line is active, i.e. at a high logic level ("1"), the latch in logic block 45-6 captures the $S_6$ sample when the corresponding $C_6$ clock signal is at the high logic level. The latch output then takes the value of the selected sample $S_6$. When the $C_7$ clock signal comes to the high logic level, the latch in the logic block 45-7 captures this $S_6$ value. The process is repeated until the selected sampled signal is transmitted to the last latch at the bottom of the latch column and then in the output latch 49. These samples prior to the selected one are not kept but having captured them allows the SSDA 26 not to lose any sampled signal if it comes to deselect sampled signal $S_i$ to select sampled signal $S_{i-1}$. Output latch 49 ensures that the sampled signal representing the datum is present on its output during a full clock period.

Figure 11:
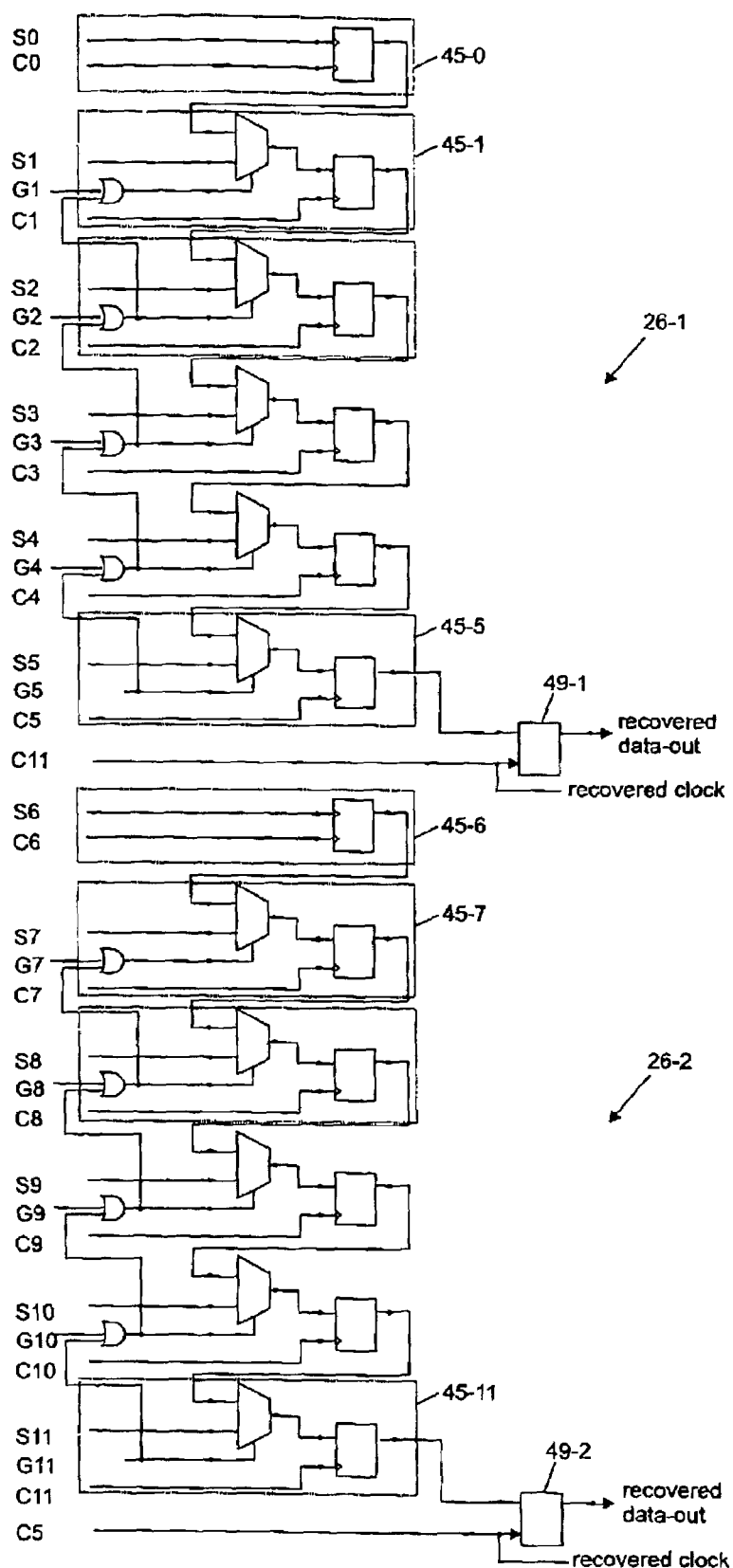
FIG. 11 shows a design variant of the sample selection and data alignment circuit of FIG. 10 when it is adapted to process two bits per clock period.

Now turning to FIG. 11, the SSDA circuit, now comprised of two elementary circuits 26-1 and 26-2, addresses the case where the frequency of the reference clock signal is half the rate of the incoming data (i.e. there are two bits in a clock period). The upper half circuit 26-1 is adapted to process the six signals $S_0$–$S_5$ corresponding to clock phase signals $C_0$–$C_5$ using select signals $G_1$ $_{to}$ $G_5$ related to the first bit of the incoming data. The lower half circuit 26-2 is identical in all respects to circuit 26-1. It processes the six signals $S_6$–$S_{11}$ using select signals $G_7$–$G_{11}$ for the second bit. It is to be noted that in this case, there are two data-out lines to transport the recovered data, so that the following circuitry must be adapted to take bits alternatively from these lines. Likewise, there are two clock lines to transport the recovered clocks (which are in phase opposition).

As a result, SSDA 26 circuit processes one bit with 12 samples, while SSDA circuits 26-1 and 26-2 process one bit with six samples within a clock period. A detailed examination of SSDA circuits 26, 26-1 and 26-2 shows that in spite of their apparent differences, they have a quite similar construction still based upon two base sections. Referring to the SSDA circuit 26 of FIG. 10, the first section consists of a plurality of logic blocks 45 and the second section consists of output latch 49. Each logic block 45 comprises a multiplexer 46, an OR gate 47 and a latch 48 connected as described above. Finally, a flip-flop or a master/slave latch pair, plays the role of the said output latch to ensure that the selected sampled signal will be present on the data-out line during a full clock period according to a key feature of the present invention. If a single latch is used, the clock phase signal applied on its clock input must be in phase opposition with the clock phase applied to the latch of the last logic block (e.g. 45-11 in the case of SSDA 26).

As such, the data recovery circuit 23-0 is able to support a phase difference between the data-in 0 stream and the recovered clock and/or a high frequency jitter (in a frequency range close to the data rate) with a high amplitude (plus or minus one half bit). To optimize the jitter immunity and the phase error reduction, it is required that the above mentioned clock recovery unit be designed to align (as much as possible) the clock phase $C_0$ with the transitions of the incoming data.

The Overflow/Underflow Detection (OD) Circuit 27

When the transmitter and the receiver reference clocks have some offset or the jitter greatly shifts the data, it would be highly desirable to extend the data selection range. SSDA circuit 26 of DR block 23 such as described above only supports a jitter amplitude limited to 1 bit, i.e. it is limited to process sampled signals within one period of the incoming data. Neither TDVM circuit 25 nor SSDA circuit 26 are designed to support an underflow or an overflow. In case of one bit per period, a selection moving from $S_0$ to $S_{11}$ (preceding $S_0$) is an underflow and a selection moving from $S_{11}$ to $S_0$ (following $S_{11}$) is an overflow. In case of two bits per period, a selection moving from $S_6$ to $S_5$ or moving from $S_0$ to $S_{11}$ is an underflow and a selection moving from $S_5$ to $S_6$ or moving from $S_{11}$ to $S_0$ is an overflow. It is theoretically possible to increase the jitter tolerance to 1.6 bits by detecting such overflow/underflow and selecting the corresponding sampled signal.

Figure 12:
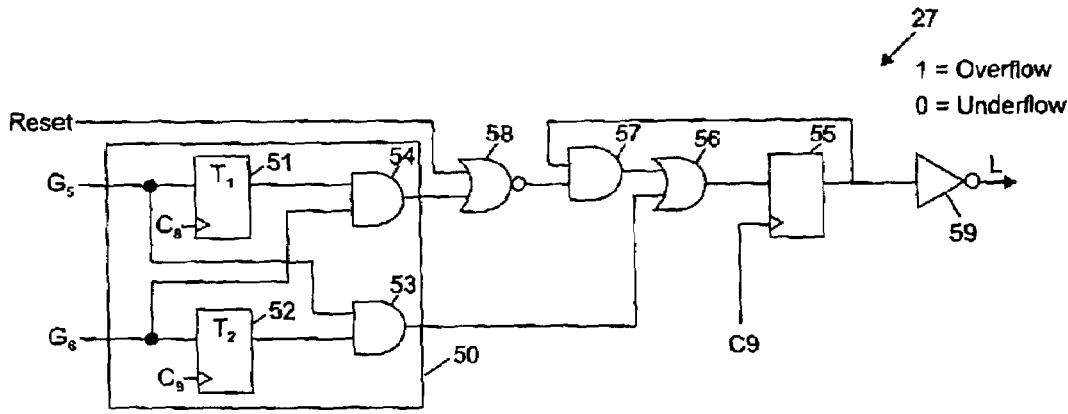
FIG. 12 shows an optional overflow/underflow detection (OD) circuit that can be used to significantly improve the operation of the sample selection and data alignment circuit and thus the overall operation of the data recovery circuit of the present invention.

FIG. 12 shows a preferred implementation of overflow/underflow detection (OD) circuit 27 to process a data bit stream having a rate equal to the clock frequency. Two identical circuits would be required if we have two bits per period of the incoming data. The OD circuit 27 detects when the TDVM circuit 25 changes the index (i) of the selected G signal through a middle point. When the edge index passes below the middle point (e.g. $G_6$ to $G_5$), the overflow/underflow bit L is equal to logic 1 designating thereby an underflow. When the edge index passes over the middle point (e.g. $G_5$ to $G_6$), the overflow/underflow bit L is equal to logic 0 designating thereby an overflow. Therefore, it processes select signals $G_5$ and $G_6$ which are at the middle of the select signal range ($G_0$–$G_{11}$).

Now turning to FIG. 12, signals $G_5$ and $G_6$ are applied to a block 50 comprised of a pair of latches 51 and 52 and of a pair of two-way AND gates 53 and 54 that are cross-coupled. Clock signals $C_8$ and $C_9$ are applied on the clock input of latches 51 and 52 respectively (any stabilized clock signal appearing after select signals $G_5$ and $G_6$ would be adequate). A latch 55, the clock input is driven by clock phase $C_9$, is provided to memorize the overflow/underflow bit L. The data input of latch 55 is driven by the output of OR gate 56. One input of OR gate 56 is connected to the output of AND gate 53 and the other input is connected to the output of AND gate 57. The output of latch 55 is applied to a first input of AND gate 57 through a loop, the other input is connected to the output of NOR gate 58. The latter receives a RESET signal and the signal generated by AND gate 54. The signal outputs by latch 55 is complemented in inverter 59 to generate the overflow/underflow bit L mentioned above. The role of OD circuit 27 is to thus detect a transition in the selection. For instance, $G_5$ to $G_6$ implies L=1 indicating thereby there is an overflow and therefore the index must be changed from 5 to 6. Note that, in case of two bits per period, two OD circuits 27-1 and 27-2 would be then required, processing select signals $G_2$/$G_3$ and $G_8$/$G_9$ respectively.

Figure 13:
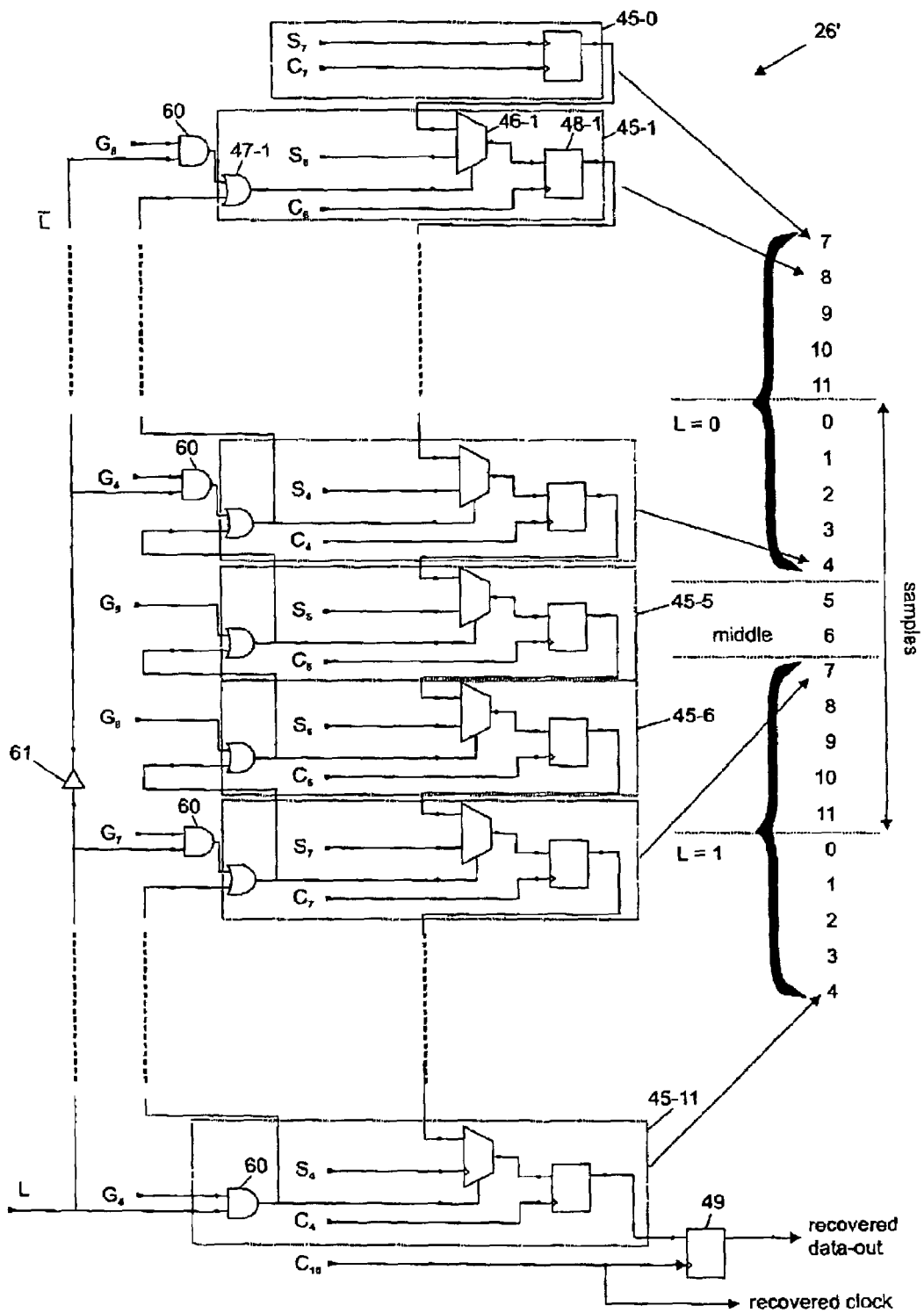
FIG. 13 shows the sample selection and data alignment circuit of FIG. 10 when it is adapted to work with the overflow/underflow detection circuit of FIG. 12.

FIG. 13 shows SSDA circuit 26 of FIG. 10, now referenced 26', after it has been modified to work with OD circuit 27. Now turning to FIG. 13, for each block 45, except blocks 45-5 and 45-6, the G signal is gated in an AND gate 60 either by signal L or by signal –L (complemented in inverter 61). Table 1 shown in FIG. 14 indicates which sampled signal S is selected versus the combination of the G signal and the underflow/overflow bit L. It is important to notice that events outside the current period can be taken in consideration. During period T+1, the sampled signal $S_0$ that was obtained at period T could now be used in lieu of signal $S_0$ generated at period T+1.

If, now SSDA circuits 26-1 and 26-2 are used instead (to be combined with circuits 27-1 and 27-2), the following Tables 2 and 3 apply.

TABLE 2

| $G_4$ | $G_5$ | $G_0$ | $G_1$ | $G_2$ | $G_3$ | $G_4$ | $G_5$ | $G_0$ | $G_1$ |
|---|---|---|---|---|---|---|---|---|---|
| 0 | 0 | 0 | 0 | X | X | 1 | 1 | 1 | 1 |
| $S_{10}$ | $S_{11}$ | $S_0$ | $S_1$ | $S_2$ | $S_3$ | $S_4$ | $S_5$ | $S_6$ | $S_7$ |

X = don't care

Table 3 shows the situation for the second bit. In this case, signals $G_8$ and $G_9$ are used as inputs instead of $G_2$ and $G_3$.

TABLE 3

| $G_{10}$ | $G_{11}$ | $G_6$ | $G_7$ | $G_8$ | $G_9$ | $G_{10}$ | $G_{11}$ | $G_6$ | $G_7$ |
|---|---|---|---|---|---|---|---|---|---|
| 0 | 0 | 0 | 0 | X | X | 1 | 1 | 1 | 1 |
| $S_4$ | $S_5$ | $S_6$ | $S_7$ | $S_8$ | $S_9$ | $S_{10}$ | $S_{11}$ | $S_0$ | $S_1$ |

As a result, at the cost of implementing an OS circuit 24 that is relatively simple, which delivers a few sampled signals S (in this case 12), DR block 23 is able to reliably discriminate data within a 70 ps width window with a clock having a period equal to T=800 ps. Extensive simulations have demonstrated that the DR block 23 is very tolerant to data jitter with an amplitude of up to 1.5 times the clock period of the incoming data. DR block 23 is insensitive to phase error between the recovered clock and any recovered data.

The term "coupled" used in the specification and in the claims includes various types of connections, either direct or through one or more intermediate components.

While the invention has been particularly described with respect to a preferred embodiment thereof it should be understood by one skilled in the art that the foregoing and other changes in form and details may be made therein without departing from the spirit and scope of the invention.

What is claimed is:

1. A data recovery circuit for generating a recovered datum from a serial data stream of bits having at least one transition between a high bit level and a low bit level, the circuit comprising:

a communication link provided with a data input for receiving the serial data stream transmitted at a specified data rate;

a multiphase clock for generating a multiphase clock signal having a period T and n clock phases wherein sequential ones of said clock phases are out of phase by T/n;

an over sampling circuit coupled to said communication link and said multiphase clock, said over sampling circuit for generating a set of over sampled signals sampled from the serial data stream at each of said n clock phases;

a transition detection circuit coupled to said multiphase clock and to said over sampling circuit, said transition detection circuit configured for detection of a transition position of said at least one transition and generation of a select signal having a select position at a determined delay with respect to said transition position, wherein said determined delay corresponds to one of said over sampled signals at about the centre of the bit associated with said at least one transition; and a sample selection/data alignment circuit coupled to said multiphase clock, to said transition detection circuit and to said over sampling circuit, said sample selection/data alignment circuit configured for generation of a recovered data signal based upon the over sampled signal at said select position and having a recovered transition position aligned with a predefined one of said n clock phases, wherein said detection of said transition position at time i is based on three comparisons performed on the sampled signals $S_{i-2}$, $S_{i-1}$, $S_{i+1}$ and $S_{i+2}$, obtained at times (i−2), (i−1), (i+1) and (i+2), respectively, according to the following rules:

$$S_{i-2} = S_{i-1} \quad (1)$$

$$S_{i-1} \neq S_{i+1} \quad (2)$$

$$S_{i+1} = S_{i+2} \quad (3)$$

so that, if said rules (1)–(3) are satisfied, then a transition detection has occurred at time/position (i).

2. The data recovery circuit of claim 1 wherein said transition detection circuit further comprises:
   validation means to verify that the position of said transition detection is a valid transition position; and
   memorization means to memorize said valid transition position.

3. The data recovery circuit of claim 1 wherein if a transition is detected at position (i), the over sampled signal to be kept is the over sampled signal at position (i+p), wherein p is said number n divided by twice the number b of bits in one period of said multiphase clock signal (p=n/2×b).

4. The data recovery circuit of claim 1 wherein said sample selection/data alignment circuit further comprises a circuit to output a recovered one of said clock phases.

5. The data recovery circuit of claim 1 wherein said transition detection circuit further generates two consecutive select signals, and said data recovery circuit further comprises:
   an overflow/underflow detection circuit coupled to said multiphase clock, to said transition detection circuit and to said sample selection/data alignment circuit, responsive to said two consecutive select signals to generate a binary signal (L) that indicates whether there is an overflow or an underflow.

6. A multichannel receiver for generating a recovered datum from a serial data stream of bits having at least one transition between a high bit level and a low bit level, the multichannel receiver comprising:

a plurality of communication links, each being provided with a data input for receiving the serial data stream at a specified data rate;

a multiphase clock for generating a multiphase clock signal having a period T and n clock phases wherein sequential ones of said clock phases are out of phase by T/n;

a plurality of data recovery units, one for each communication link, each data recovery unit including:

an over sampling circuit coupled to said communication link and said multiphase clock, said over sampling circuit for generating a set of over sampled signals sampled from the serial data stream at each of said n clock phases;

a transition detection circuit coupled to said multiphase clock and to said over sampling circuit, said transition detection circuit configured for detection of a transition position of said at least one transition and generation of a select signal having a select position at a determined delay with respect to said transition position, wherein said determined delay corresponds to one of said over sampled signals at about the centre of a bit; and a sample selection/data alignment circuit coupled to said multiphase clock, to said transition detection circuit and to said over sampling circuit, said sample selection/data alignment circuit configured for generation of a recovered data signal based upon the over sampled signal at said select position and having a recovered transition position aligned on a predefined one of said n clock phases, wherein said detection of said transition position at time i is based on three comparisons performed on the sampled signals $S_{i-2}$, $S_{i-1}$, $S_{i+1}$ and $S_{i+2}$, obtained at times (i−2), (i−1), (i+1) and (i+2), respectively, according to the following rules:

$$S_{i-2} = S_{i-1} \quad (1)$$

$$S_{i-1} \neq S_{i+1} \quad (2)$$

$$S_{i+1} = S_{i+2} \quad (3)$$

so that, if said rules (1)–(3) are satisfied, then a transition detection has occurred at time/position (i).

* * * * *